(12) United States Patent
Cook et al.

(10) Patent No.: US 11,341,557 B2
(45) Date of Patent: May 24, 2022

(54) METHOD AND SYSTEM FOR PROVIDING PRODUCT RECOMMENDATIONS

(71) Applicant: Conopco, Inc., Englewood Cliffs, NJ (US)

(72) Inventors: Joanne Louise Cook, Wirral (GB); Myriam Fessi, Liverpool (GB); Mark Robert Florence, Newton, MA (US); Abid Iftikhar, Liverpool (GB); Jamie Gordon Nichol, Carlisle, MA (US); Stephen Lee Wire, Wirral (GB)

(73) Assignee: Conopco, Inc., Englewood Cliffs, NJ (US)

( * ) Notice: Subject to any disclaimer, the term of this patent is extended or adjusted under 35 U.S.C. 154(b) by 326 days.

(21) Appl. No.: 15/754,447

(22) PCT Filed: Aug. 16, 2016

(86) PCT No.: PCT/EP2016/069368
§ 371 (c)(1),
(2) Date: Feb. 22, 2018

(87) PCT Pub. No.: WO2017/032637
PCT Pub. Date: Mar. 2, 2017

(65) Prior Publication Data
US 2018/0247365 A1 Aug. 30, 2018

(30) Foreign Application Priority Data

Aug. 27, 2015 (EP) .................................. 15182780

(51) Int. Cl.
G06Q 30/06 (2012.01)
A45D 44/00 (2006.01)
(Continued)

(52) U.S. Cl.
CPC ......... *G06Q 30/0631* (2013.01); *A45D 44/00* (2013.01); *A45D 44/005* (2013.01);
(Continued)

(58) Field of Classification Search
CPC ........... G06Q 30/0631; G06Q 30/0201; A45D 44/00; A45D 44/005; A45D 2044/007;
(Continued)

(56) References Cited

U.S. PATENT DOCUMENTS 9,326,685 B2 5/2016 Krishnan et al.
2002/0109378 A1 8/2002 Flores
(Continued)

FOREIGN PATENT DOCUMENTS

CN 101076270 11/2007
CN 10381571 5/2014
(Continued)

OTHER PUBLICATIONS

Hokr, B. H. "Lens to Turn Smartphone into Microscope." (Year: 2015).*
(Continued)

*Primary Examiner* — Michelle T Kringen
(74) *Attorney, Agent, or Firm* — Foley & Lardner LLP

(57) ABSTRACT

A method of and system for recommending one or more products to a consumer from a plurality of products, the system comprising: a user interface; and a processor configured to: provide a list of questions for the consumer at the user interface, each question having a defined set of answers; calculate a consumer score for each question using the answer chosen by the consumer at the user interface; calculate a recommendation score for each question, using the consumer score; and select the one or more products for recommendation to the consumer based on the recommendation score.

16 Claims, 9 Drawing Sheets

(51) Int. Cl.
*G06Q 30/02* (2012.01)
*G02B 21/00* (2006.01)
*G02B 21/02* (2006.01)
*G02B 21/36* (2006.01)
*G06F 7/02* (2006.01)
*G06T 7/00* (2017.01)

(52) U.S. Cl.
CPC ......... *G02B 21/0008* (2013.01); *G02B 21/02* (2013.01); *G02B 21/367* (2013.01); *G06F 7/026* (2013.01); *G06Q 30/0201* (2013.01); *A45D 2044/007* (2013.01); *G06T 7/0002* (2013.01); *G06T 2207/10056* (2013.01)

(58) Field of Classification Search
CPC .. G02B 21/0008; G02B 21/01; G02B 21/367; G06F 7/026; G06T 7/0002
USPC ........................................................ 705/26.7
See application file for complete search history.

(56) References Cited

U.S. PATENT DOCUMENTS

| | | | |
|---|---|---|---|
| 2003/0012461 A1 | 1/2003 | Satoh et al. | |
| 2003/0045799 A1 | 3/2003 | Bazin et al. | |
| 2003/0078971 A1* | 4/2003 | Mori ................ | G06Q 30/02 709/204 |
| 2003/0085303 A1 | 5/2003 | Jaeger | |
| 2003/0227612 A1* | 12/2003 | Fein ................ | G02B 21/365 356/39 |
| 2006/0005409 A1 | 1/2006 | Cohen | |
| 2006/0085274 A1 | 4/2006 | Sottery et al. | |
| 2007/0054261 A1 | 3/2007 | Sherman et al. | |
| 2008/0194928 A1* | 8/2008 | Bandic ............. | G16H 15/00 600/306 |
| 2011/0090328 A1 | 4/2011 | Chen | |
| 2012/0041284 A1 | 2/2012 | Krishnan | |
| 2012/0120223 A1 | 5/2012 | Zuest et al. | |
| 2013/0191203 A1 | 7/2013 | Balassanian | |
| 2014/0046965 A1 | 2/2014 | Tian et al. | |
| 2014/0136362 A1 | 5/2014 | Shaya et al. | |
| 2014/0236622 A1 | 8/2014 | Southam | |
| 2015/0081469 A1* | 3/2015 | Acharyya ......... | G06Q 30/0631 705/26.7 |
| 2018/0247365 A1 | 8/2018 | Cook et al. | |

FOREIGN PATENT DOCUMENTS

| | | |
|---|---|---|
| CN | 103620592 | 3/2015 |
| CN | 104619242 | 5/2015 |
| JP | 2001324680 | 11/2001 |
| JP | 2006235423 | 9/2006 |
| JP | 2007019656 | 1/2007 |
| JP | 2007019656 A * | 1/2007 |
| JP | 2007065223 | 3/2007 |
| JP | 2008517274 | 5/2008 |
| JP | 2008187475 | 8/2008 |
| JP | 2009506418 | 2/2009 |
| JP | 2014113467 | 6/2014 |
| JP | 2014522500 A | 9/2014 |
| JP | 6855451 B2 | 4/2021 |
| WO | WO2010049907 | 5/2010 |
| WO | 2012174182 A1 | 12/2012 |
| WO | 2013126648 | 8/2013 |
| WO | WO2013160793 | 10/2013 |
| WO | WO2014040853 | 3/2014 |

OTHER PUBLICATIONS

IPRP1 in PCTEP2016069367, Feb. 27, 2018.
IPRP2 in PCTEP2016069368, Nov. 29, 2017.
Search Report and Written Opinion in EP15182759, dated Feb. 10, 2016.
Search Report and Written Opinion in PCTEP2016069367, dated Oct. 10, 2016.
Search Report and Written Opinion in PCTEP2016069368, dated Oct. 28, 2016.
Search Report in EP15182780, dated Oct. 15, 2015.
Written Opinion in EP15182780, dated Oct. 15, 2015.
Written Opinion2 in PCTEP2016069368, dated Jul. 28, 2017.
Co-Pending U.S Appl. No. 15/754,437, filed Feb. 22, 2018.

* cited by examiner

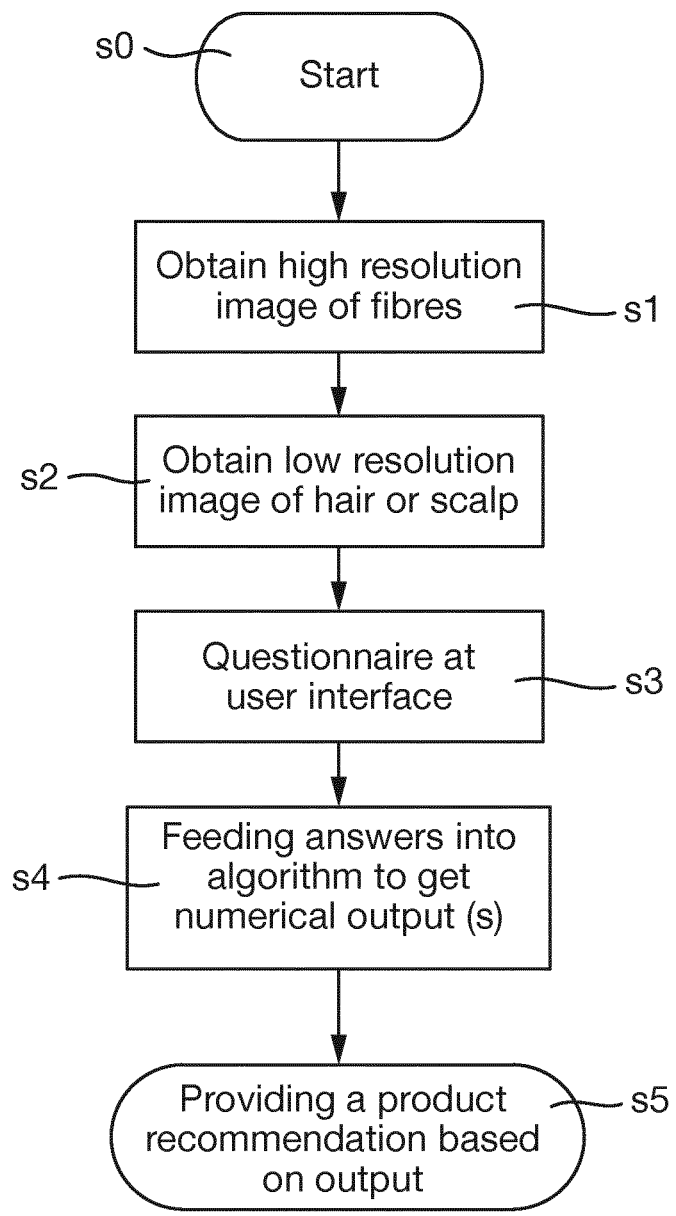

Fig. 8a

| Master Matrix | | Question 1 | | | Question 2 | |
|---|---|---|---|---|---|---|
| | | Q1A1 | Q1A2 | Q2A1 | Q2A2 |
| Benefit | Moisture | -1 | 0 | 0 | -1 |
| | Basic Clean | 0 | 1 | 1 | 0 |
| | Intense | 0 | 1 | 0.5 | 0 |
| Heaviness | Light | 0 | -1 | -0.5 | 0 |
| Format | Shampoo | 0 | 1 | 1 | 0 |
| | Conditioner | 0 | 1 | 1 | 0 |

Fig. 8b

| Benefit Weightings | |
|---|---|
| Primary Benefit | 0.4 |
| Secondary Benefit | 0.2 |
| Heaviness | 0.2 |
| Format | 0.2 |
| Number of Secondary Benefits (n) | 1 |

Fig. 9a

| Product Benefits Input for Product 1 | |
|---|---|
| Primary Benefit | Moisture |
| Secondary Benefit | Basic Clean |
| Heaviness | Intense |
| Format | Shampoo |

Fig. 9b

| Product Matrix (Product 1) | | Question 1 | | Question 2 | |
|---|---|---|---|---|---|
| | | Q1A1 | Q1A2 | Q2A1 | Q2A2 |
| Primary Benefit | Moisture / Basic Clean | -1 | 0 | 0 | -1 |
| Secondary Benefit | Moisture / Basic Clean | 0 | 1 | 1 | 0 |
| Heaviness | Intense / Light | 0 | 1 | 0.5 | 0 |
| Format | Shampoo / Conditioner | 0 | 1 | 1 | 0 |
| Product 1 Benefit Scores | | -0.4 | 0.6 | 0.5 | -0.4 |

Fig. 10a

| Product Benefits Input for Product 2 | |
|---|---|
| Primary Benefit | Basic Clean |
| Secondary Benefit | Moisture |
| Heaviness | Light |
| Format | Shampoo |

Fig. 10b

| Product Matrix (Product 2) | | Question 1 | | Question 2 | |
|---|---|---|---|---|---|
| | | Q1A1 | Q1A2 | Q2A1 | Q2A2 |
| Primary Benefit | Moisture / Basic Clean | 0 | 1 | 1 | 0 |
| Secondary Benefit | Moisture / Basic Clean | -1 | 0 | 0 | -1 |
| Heaviness | Intense / Light | 0 | -1 | -0.5 | 0 |
| Format | Shampoo / Conditioner | 0 | 1 | 1 | 0 |
| Product 2 Benefit Scores | | -0.2 | 0.4 | 0.5 | -0.2 |

Fig. 11a

| Product Output | Question 1 | | Question 2 | |
|---|---|---|---|---|
| | Q1A1 | Q1A2 | Q2A1 | Q2A2 |
| Product 1 | -0.4 | 0.6 | 0.5 | -0.4 |
| Product 2 | -0.2 | 0.4 | 0.5 | -0.2 |

Fig. 11b

| Consumer Answers | Question 1 | | Question 2 | |
|---|---|---|---|---|
| | Q1A1 | Q1A2 | Q2A1 | Q2A2 |
| Consumer 1 | 0 | 1 | 1 | 0 |
| Comsumer 2 | 1 | 0 | 0 | 1 |

Fig. 11c

| Consumer 1 Recomendation | Question 1 | | Question 2 | | Sum |
|---|---|---|---|---|---|
| | Q1A1 | Q1A2 | Q2A1 | Q2A2 | |
| Product 1 | 0 | 0.6 | 0.5 | 0 | 1.1 |
| Product 2 | 0 | 0.4 | 0.5 | 0 | 0.9 |

Fig. 11d

| Consumer 2 Recomendation | Question 1 | | Question 2 | | Sum |
|---|---|---|---|---|---|
| | Q1A1 | Q1A2 | Q2A1 | Q2A2 | |
| Product 1 | -0.4 | 0 | 0 | -0.4 | -0.8 |
| Product 2 | -0.2 | 0 | 0 | -0.2 | -0.4 |

METHOD AND SYSTEM FOR PROVIDING PRODUCT RECOMMENDATIONS

FIELD OF THE INVENTION

The present invention relates to a system for evaluating the condition of hair and scalp and recommending suitable products/solution/regime for the consumer and a method of evaluating and recommending products, using the system.

BACKGROUND OF THE INVENTION

It is useful to evaluate properties of hair. Particularly useful assessments include visual damage along the hair fibre, for example, split ends at the hair tips; cuticle condition; hair diameter (which can be indicative of a number of attributes linked with healthy or damaged hair); scalp sebum; scalp dandruff; hair abundance (how many hairs in a specific area of scalp) and follicle occupancy (number of hairs coming out of each follicle). Evaluation of such properties enables the beneficial choice of products that suit the particular condition of the hair.

These properties are linked to a number of consumer hair concerns for scalp and hair condition and impact consumers' choice of hair care products. Selection of appropriate products for any given individual often begins with an evaluation of the individual's scalp and/or hair.

Although consumers do self-assess their scalp and hair condition, such qualitative self-assessments frequently lack accuracy. Further, such assessments do not comprise a benchmarking step against a reference standard for good and bad condition.

There are a number of microscopes available for such assessments.

US2012/0120223 discloses a portable microscope comprising an integrated operator control unit configured for at least one of selecting and adjusting at least one electrically controllable function of the microscope. The operator control unit includes at least one sensor configured to receive user control commands for at least one of activation, deactivation and adjustment thereof. The sensor includes a touch sensor and is disposed so as to accommodate holding and operation of the microscope with a single hand of the user.

Our co-pending application, WO2014/040853 discloses a device for evaluating skin and/or hair condition which device comprises: a) a housing; b) a hydration meter for measuring moisture or hydration value, which meter is supported by and projects from at least one end of the housing, the end of which meter comprises a surface evaluation area having an aspect ratio wherein the width is greater than length or width is greater than height (>1:1 to about 20:1); c) a camera supported by and projecting from a separate end of said housing; and d) a further separate end comprising an electrical wire or cord terminating in a means for communicating with a computer.

However, these devices lack the functionality relating to the optimization of resolution and polarity from a single unit device. Most of the high resolution microscopes on the market require extra effort to obtain a high resolution focused image and hence require trained personnel to carry out such procedures. There is a need to address these issues.

We have now found that hair and scalp can be conveniently and effectively examined using a hand held imaging device comprising both a high and a low magnification optic, wherein the high magnification optic has a slot for locating hair fibres in frame, and a fixed focal length configured such that the located hair fibres are in focus and no manual focusing is required. The slot preferably has a width of from 0.5-1.0 mm, more preferably from 0.7-0.9 mm, and a depth of from 10 to 20 mm, preferably from 12 to 15 mm.

DEFINITION OF THE INVENTION

According to a first aspect of the present invention, there is provided: a system for recommending one or more products to a consumer from a plurality of products, the system comprising: a user interface; and a processor configured to: provide a list of questions for the consumer at the user interface, each question having a defined set of answers; access a plurality of product parameter inputs for each product, each product parameter input having a defined set of product parameter values; access a product matrix, the product matrix assigning a numerical score to each parameter value for each question; access a weighting factor for each product parameter input; calculate a product score for each question using the product parameter value, the score for that value and the weighting factor for that value; calculate a consumer score for each question using the answer chosen by the consumer at the user interface; calculate a recommendation score for each question, using the product score and the consumer score; and select the one or more products for recommendation to the consumer based on the recommendation score.

Optionally, when selecting the one or more products, the processor is configured to: calculate a total score for each product as the sum of the recommendation scores from each question; rank the one or more products based on the recommendation score; and select the one or more products for recommendation to the consumer based on their position in the ranking.

The product matrix may be stored on an external server which is accessed by the system over a network such as a WAN or LAN.

Optionally, the one or more products are hair products. The hair products may include rinse-off and/or leave-in hair products, for example, shampoo, conditioner, hair treatments and styling products. The product parameters may include: primary benefit; secondary benefit; heaviness; and/or format. The value of the primary benefit product parameter may include for example: moisture; basic clean. The value of the secondary benefit product parameter may include for example: moisture; basic clean. The value of the format may correspond to the type of hair product for example, shampoo, conditioner, hair treatment or styling product.

The defined set of answers for each question may preferably include no more than 10 answers, more preferably no more than 5 answers and may be presented to the user alongside the relevant question using a graphical user interface at the user interface.

When providing questions to the consumer, the method may include the extra step of providing pictorial references to the consumer to aid their selection. For example, pictorial references may depict straight/wavy/curly hair. In this way, the accuracy of answer given (and therefore the recommendation made) can be improved.

The questionnaire is preferably an app suitable for use on a mobile device, a computer, a tablet or other software devices. The GUI of the app may provide the defined set of answers to each question in the form of a slide-selection or a drop down menu.

Preferably, the numerical scores assigned to parameter values include both positive and negative numbers.

Optionally, when calculating the product score for each question, the processor is configured to: retrieve the product parameter value for that question; retrieve the numerical score for that product parameter from the product matrix; retrieve the weighting factor for that product; and multiply the numerical score by the weighting factor to generate the product score.

Optionally, the system further comprises a master matrix which stores numerical values for each question, for each product parameter.

Both the product matrix and the master matrix may be stored on an external server. Product management software may be used to input the product details into the product matrix. The software retrieves the relevant scores from the master matrix for that product and these scores are then transferred to the product matrix.

Optionally, the product matrix retrieves numerical scores for each product parameter input of that product from the master matrix.

The master matrix preferably takes the form of a lookup table containing the scores for all the possible product benefits.

The product matrix preferably takes the form of a summary table, which has calculates a sum of all of the relevant scores for that product.

For example, if a product is moisturising, gives shine and eliminates frizz, the product matrix will return the sum of the scores relating to moisture, shine and frizz, for each of the Q&A combinations from the master matrix.

If only one matrix was used instead of this advantageous combination of a product and master matrix, it would be necessary to build one matrix that listed all products and had scores reflecting how relevant each product would be for each Q&A combination. This would be less credible, since the products would not be characterised in terms of the benefits they provide. Such a system could be acceptable for a limited range of products, but it would become difficult to manage for larger product sets.

Optionally, the system further comprises an imaging device for measuring one or more physical properties of the hair.

Where the system comprises an imaging device, the hand held imaging device may comprise: a housing with a high magnification optic for obtaining magnified images of surface characteristics of hair fibres, said high magnification optic comprising a first lens and a first light source; and a low magnification optic for obtaining magnified images of the scalp and hair, said low magnification optic comprising a second lens and a second light source, wherein the high magnification optic has a fixed focal length and a slot for locating hair fibres in frame such that the hair fibres are in focus and wherein the device further comprises a viewing means, selected from an integral viewing means, an external viewing means and a combination thereof.

The imaging device may be handheld.

Optionally, the low magnification optic may have a light polarisation assembly, such that polarised and non-polarised illumination can be selected.

Optionally, the light polarisation assembly may be powered or controlled remotely from a software application which may be the same software application which presents the list of questions to the consumer.

Optionally, the low magnification optic may have a fixed focal length.

Optionally, the low magnification optic may have a cap, to define a fixed and easily reproducible spacing between the lens and the surface.

Optionally, the imaging device may comprise more than one light, preferably six or more lights. Where a plurality of lights are present, these may be arranged circularly around the low magnification optic located at a tip of the device with regular spacing intervals.

The imaging device may further comprise a means for connecting to a software device, preferably selected from a USB connector, or via wireless connectivity.

The imaging device may be directly connected to a software device. The connection may enable images to be transferred from the imaging device to the software device.

The system may be configured to: assign a numerical value to the measurement of the physical property of the hair; and use this numerical value to calculate a recommendation score based on the physical property. This numerical value may be combined with the recommendation values output by the questionnaire to assist in the recommendation of the product. The numerical value could therefore form part of the product and/or master matrix. The numerical value may be a positive and/or negative integer or a decimal to one significant figure rather than using the actual measurements to populate the matrix.

For example, the tips of the hair and find split ends may be analysed by the imaging device and the product matrix designed such that products with damage or split end repair benefits are favoured. The imaging device could be adapted to measure tip damage, hair diameter, presence of dandruff, presence of sebum, follicle occupancy and hair density; all of these factors can feed into the product recommendation via the algorithm(s) carried out by the processor of the system.

The physical properties may also include the diameter of the hair and/or a measurement of the curliness of the hair.

According to a second aspect of the present invention, there is provided: a method of recommending one or more products to a consumer from a plurality of products, the method comprising: providing a list of questions for the consumer, each question having a defined set of answers; providing a plurality of product parameter inputs for each product, each product parameter input having a defined set of product parameter values; providing a product matrix, the product matrix assigning a numerical score to each parameter value for each question; providing a weighting factor for each product parameter input; calculating a product score for each question using the product parameter value, the score for that value and the weighting factor for that value; calculating a consumer score for each question using the answer chosen by the consumer; calculating a recommendation score for each question, using the product score and the consumer score; and selecting the one or more products for recommendation to the consumer based on the recommendation score.

It should be understood that the optional features discussed above in relation to the first aspect could equally apply to the second aspect.

In particular, the step of selecting the one or more products may include the step of: calculating a total score for each product as the sum of the recommendation scores from each question; ranking the one or more products based on the recommendation score; and selecting the one or more products for recommendation to the consumer based on their position in the ranking.

The one or more products may be hair products including rinse-off and leave-in products: shampoo, conditioner, hair treatments and styling products.

The step of calculating the product score for each question includes the steps of: retrieving the product parameter value for that question; retrieving the numerical score for that product parameter from the product matrix; retrieving the weighting factor for that product; and multiplying the numerical score by the weighting factor to generate the product score.

The method of recommending one or more products to a consumer may include a method for evaluating condition of hair of an individual, using the imaging device, and subsequently recommending products appropriate to the condition of the hair. This method for evaluating the condition of the hair may comprise the steps of:

1) placing hair fibres in the slot of the imaging device and obtaining a high resolution image of the fibres;

2) optionally placing the low magnification optic onto the hair or scalp and obtaining an image;

3) asking the individual to provide answers to a questionnaire;

4) feeding the answers arising from step 3) into an algorithm and obtaining output therefrom; and 5) using the images of steps 1) and 2) in conjunction with the output from the algorithm to provide a product recommendation.

According to a third embodiment of the present invention, there is provided: a computer program for recommending one or more products to a consumer from a plurality of products, the computer program configured to: provide a list of questions for the consumer, each question having a defined set of answers; provide a plurality of product parameter inputs for each product, each product parameter input having a defined set of product parameter values; provide a product matrix, the product matrix assigning a numerical score to each parameter value for each question; provide a weighting factor for each product parameter input; calculate a product score for each question using the product parameter value, the score for that value and the weighting factor for that value; calculate a consumer score for each question using the answer chosen by the consumer; calculate a recommendation score for each question, using the product score and the consumer score; and select the one or more products for recommendation to the consumer based on the recommendation score.

The computer program may take the form of a computer program product for recommending one or more products to a consumer from a plurality of products, the computer program product tangibly embodied in a non-transitory computer readable medium, the computer program product including instructions being configured to cause a data processing apparatus to: provide a list of questions for the consumer, each question having a defined set of answers; provide a plurality of product parameter inputs for each product, each product parameter input having a defined set of product parameter values; provide a product matrix, the product matrix assigning a numerical score to each parameter value for each question; provide a weighting factor for each product parameter input; calculate a product score for each question using the product parameter value, the score for that value and the weighting factor for that value; calculate a consumer score for each question using the answer chosen by the consumer; calculate a recommendation score for each question, using the product score and the consumer score; and select the one or more products for recommendation to the consumer based on the recommendation score.

In some embodiments, the recommendation score calculated as a result of the user's answers to questions is an alternative to the recommendation score generated in response to the user's hair measurement. The user can choose whether to use the imaging device or the user interface to arrive at their recommendation value, and therefore at the recommended products. A single workstation is therefore versatile, as it can adapt to a user's preference.

As an alternative embodiment, or in combination with the embodiment described above, an overall recommendation score is calculated which incorporates not only the recommendation score calculated in response to the questionnaire answers, but also the recommendation score generated by the measurement of hair by the imaging device. For example, in some embodiments, the overall recommendation score is an average of the recommendation score calculated by the user interface in response to the questionnaire answers and the recommendation score generated by the measurement of hair by the imaging device. The average may be a straightforward mean value of the two results, or may be a weighted average with one of the recommendation values being given a higher weighting than the other.

According to a fourth aspect, there is provided a workstation comprising the system of the first aspect and/or configured to carry out the method of the second aspect.

As part of the system of the first aspect, the workstation may comprise the hand held imaging device described above and a screen, wherein the hand held device and the screen are positioned on a unitary base.

It will be clear to the skilled person that the hand held imaging device of the present may be used for measuring characteristics of many different types of fibres, for example, hair, wool, textiles, synthetic fibres by using the slot (4) of the high magnification optic.

BRIEF DESCRIPTION OF THE FIGURES

Embodiments of the invention will now be described with reference to the following non-limiting drawings in which:

FIG. 7 is a schematic diagram of a method of recommending one or more products to a consumer from a plurality of products.

FIG. 8a is an example of a Master Matrix for use in a system of the invention.

FIG. 8b is an example of a Benefit Weightings table for use in a system of the invention.

FIG. 9a is an example of a product benefits input for a first product.

FIG. 9b is an example of a Product Matrix for the product of FIG. 9a.

FIG. 10a is an example of a product benefits input for a second product.

FIG. 10b is an example of a Product Matrix for the product of FIG. 10a.

FIG. 11a is an example of a product output table created by the system of the invention.

FIG. 11b is an example of consumer answers to questions asked by the system of the invention.

FIG. 11c is an example showing calculation of a recommendation for a first consumer based on the data collected and calculated in FIGS. 8-10.

FIG. 11d is an example showing calculation of a recommendation for a second consumer based on the data collected and calculated in FIGS. 8-10.

FIG. 1 is a perspective view of the device comprising a housing (1), a high magnification optic (2), a low magnification optic (3), a slot (4), a means for connecting to an external viewing means (5), a shutter button (6), a gripping portion (7) and a spacer cap (8).

FIG. 2 is a view of the device showing internal elements. In this figure, the high magnification optic (2) is shown along with its component first lens (9) and first light source (10), and the low magnification optic (3) is also shown to comprise a second lens (11) and a second light source (12).

FIG. 3 is a perspective view of the slot feature in use. A bundle of hair fibres (13) is held in the slot (4) to obtain a high resolution image.

FIG. 4 is a view of the low magnification end showing the supporting ring (15) with eight spatially arranged lights (14). The spacer cap (8) can be twisted in order to polarize the light.

FIG. 5 is a perspective view of a workstation (16) comprising the hand held imaging device (17) resting in a stand (18) and a screen (19), all positioned on a unitary base (20).

DETAILED DESCRIPTION OF THE INVENTION

Figure 1:
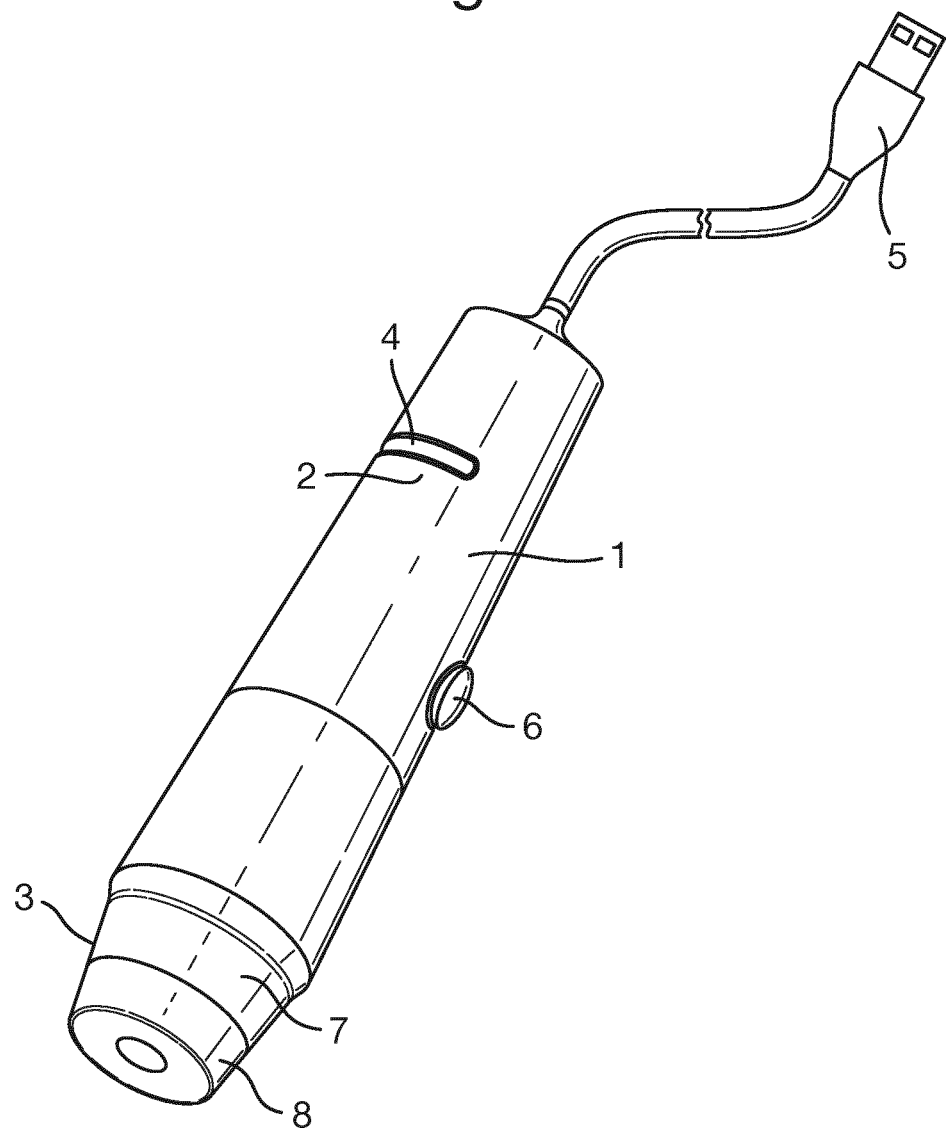
FIG. 1 is a perspective view of a hand held imaging device for use with some embodiments of the invention.
Figure 2:
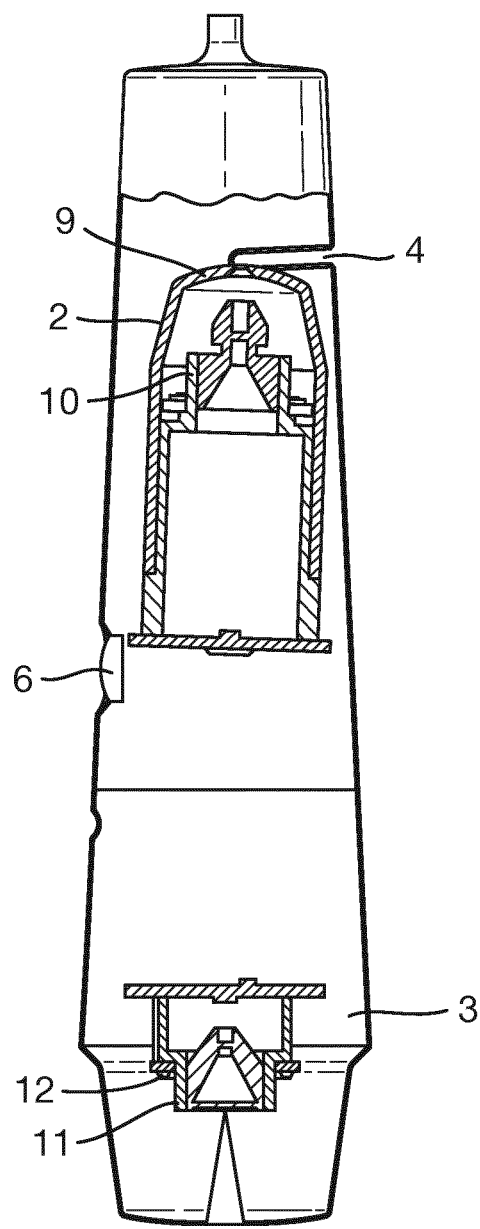
FIG. 2 is a perspective view of a hand held imaging device showing internal elements.
Figure 3:
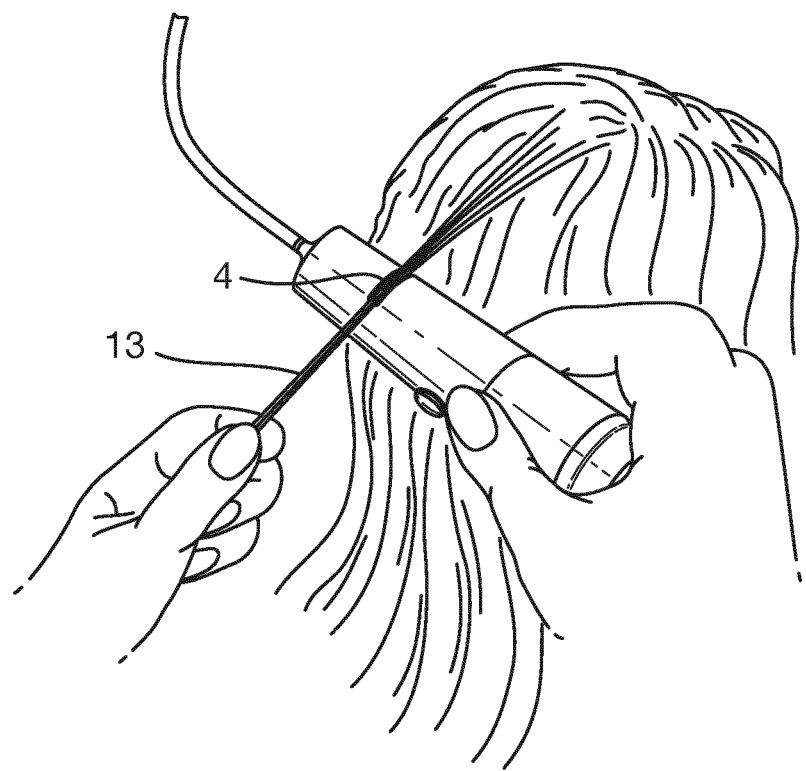
FIG. 3 is a perspective view of a hand held imaging device in use.
Figure 4:
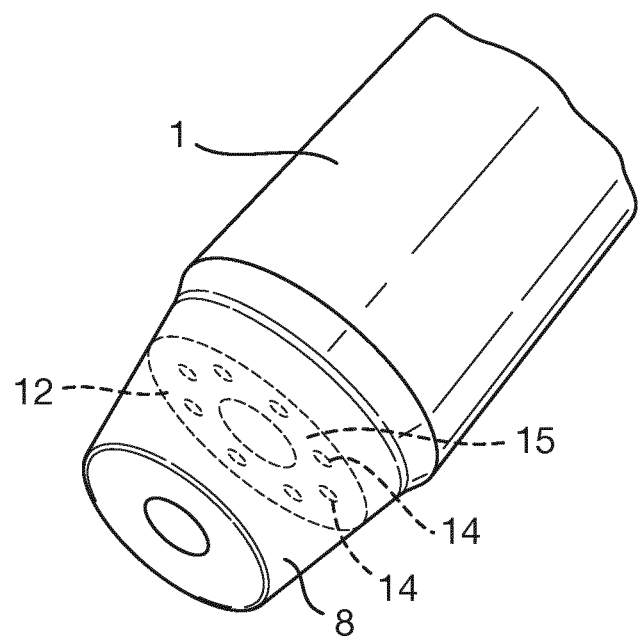
FIG. 4 is a view of the low magnification end showing the supporting ring (15) with eight spatially arranged lights.

The present invention relates to a hand held imaging device for measuring characteristics of hair and scalp.

By the terms "hand-holdable" or "hand held" is meant a device typically measuring in length (not including any cord) less than 35 centimeters (cm), preferably between 10 and 25 cm and a width between 2 and 8 cm, preferably between 3 and 6 cm.

The device is preferably a microscope.

The device preferably has a tip end that can be held in close proximity to the scalp and roots of the hair.

The Housing

The device features a housing (1). Normally, the housing is formed of a relatively hard plastic such as ABS (polyacrylonitrile-butadiene-styrene) which is a high impact resistant plastic.

Preferably, the housing has a gripping portion (7) which can be as simple as an indentation or depression for the thumb. Preferably the gripping portion forms an area that is flush with the housing. In a preferred embodiment, the gripping portion is formed from a material having a relatively high coefficient of friction (relative to that of the housing), which is soft but durable. Such materials can be natural, for example rubber, or synthetic, for example PVC, polyurethane and silicone based materials.

The High Magnification Optic

The high magnification optic is used for obtaining magnified images of surface characteristics of individual hair fibres. For example, details of cuticles and split ends.

The high magnification optic (2) comprises a first lens (9) and a first light source (10). The light source and lens are aligned such that the light source is directed onto the hair and a magnified image of the hair is created through the lens.

The high magnification optic has a slot (4) for locating hair fibres in frame, and a fixed focal length configured such that the located hair fibres are in focus and no manual focusing is required. The slot preferably has a width of from 0.25-0.35 mm, more preferably from 0.26-0.30 mm, most preferably from 0.27-0.29 mm and a depth of from 10 to 20 mm, preferably from 12 to 15 mm.

The resolution of the high magnification optic is preferably in the range of 500 to 1500 times (500 to 1500×), more preferably from 600 to 1000×, most preferably from 700 to 900×.

The number of hair fibres is preferably from 1 to 100, more preferably from 5 to 50. It was found that the number of fibres affected the image quality. We have found that the use of a bundle of 1 to 100, particularly 5 to 50 hairs is particularly advantageous in the attainment of at least one hair in focus at any one time. Thus no manual focusing is required to obtain a focused image.

The high magnification optic is advantageously used to obtain high quality images of the hair fibres along the length of the shaft and the tips of the fibre when the hair is attached to the head of a user. It can also be used to image the roots, when using loose hairs.

The Low Magnification Optic

The low magnification optic comprises a second lens (11) and a second light source (12). The light source and lens are aligned such that the light source is directed onto the hair and/or scalp and a magnified image of the hair and/or scalp is created through the lens. The low magnification optic (3) is preferably located at the tip of the hand held imaging device that can be held in close proximity to the scalp and hair.

The resolution of the low magnification optic is preferably in the range of 10 to 200 times (10 to 200×), more preferably from 25 to 150×, most preferably from 30 to 100×.

The low magnification optic may have a fixed focal length or a variable adjustable focal length.

Where the focal length is fixed, the low magnification optic preferably has a spacer cap (8), to give the correct spacing between the lens and the surface.

Where the focal length is variable, a focusing means is required. This may adjust the position of the lens or the length of the microscope. A preferred focal means is a focusing wheel. An adjustable focusing cap may be adjusted by pulling or twisting the cap to alter the length, thus changing the focus.

The low magnification optic comprises a second light source.

The second light source preferably comprises more than one light, preferably from four to ten lights, most preferably eight lights, spatially arranged (14) around the low magnification optic, located at the tip of the device. Preferably, this is achieved by positioning the lights on a ring (15) supporting the lights. Preferably, the lights are Light Emitting Diodes (LEDs).

The low magnification optic preferably has a light polarisation assembly, such that polarised and non-polarised illumination can be selected. Preferably, the light polarisation assembly is powered and/or controlled remotely from a software application. Alternatively, the polarization can be controlled by mechanical means, preferably with a button or by twisting a cap, such as a spacer cap, at the low magnification end of the microscope. Polarisation can enable better images of features of the hair and scalp to be obtained.

The low magnification optic is used for obtaining magnified images of the scalp and hair. The low magnification optic is advantageously used to obtain high quality images of the hair root area (near the scalp) and of the scalp when the hair is attached to the head of a user. It may be used to obtain images of all parts of the fibre when using loose hairs. The low magnification optic highlights a number of features which can be indicative of attributes linked with healthy or damaged hair, for example scalp sebum; scalp dandruff; hair abundance (how many hairs in a specific area of scalp) and follicle occupancy (number of hairs coming out of each follicle.

The Viewing Means

Preferably, supporting software captures the data signal from the microscope and converts it to a digital image, which can then be shown on the viewing means.

The device comprises a viewing means, which is selected from an integral viewing means, an external viewing means and a combination thereof.

The viewing means is for the purpose of viewing images of the hair and scalp that are obtained by the high magnification optic and the low magnification optic of the device.

The images may be viewed directly through a viewing means that is internal to the device, such as a small screen built into the device. The images may be transferred to an external viewing means such as a screen.

Suitable integral viewing means include a screen that is integral to the housing of the device, and an integral eye piece. Such a screen will be a miniature screen, compatible with the size of the hand held imaging device.

Preferably, the viewing means is an external viewing means. Where an external viewing means is used, means for connecting to an external viewing means will be required. Preferred means for connecting are a USB connector, a phono connector and wireless connectivity.

Preferably the external viewing means is a separate device, that comprises a screen, to which the hand held imaging device of the invention can be releasably connected. Preferred such separate devices include a computer, a monitor, a mobile phone, a tablet and a laptop.

Image Capture

The hand held device may comprise an optional shutter operating means, for example a shutter button (6). It is preferred if the shutter operating means is located on the opposite side of the housing to the slot. This promotes ease of operation with one hand whilst the device is in use.

The images of the hair and scalp can be displayed on a screen. Images may be captured (for example recorded or saved) on a software device.

The images are used to make an assessment of the condition of the hair and/or scalp. The images may also be used in conjunction with the output from an algorithm to evaluate hair or scalp condition.

An assessment may be made by comparison to a set of images showing incremental differences in a condition of the hair, such as damage. Damage may be shown, for example, by cuticle lifting, cuticle erosion, split ends and so on. This will be apparent from images obtained from the high magnification optic. Similarly the features can be assessed which will be apparent from images obtained from the low magnification optic, which can be indicative of a number of attributes linked with healthy or damaged hair, for example scalp sebum; scalp dandruff; hair abundance (how many hairs in a specific area of scalp) and follicle occupancy (number of hairs coming out of each follicle.

A product recommendation may be made by comparing the assessment to a list of products designed to alleviate the conditions of the hair, such as cuticle lifting, cuticle erosion, split ends, presence of sebum, dandruff, hair abundance, follicle occupancy and so on. This may be carried out manually or by software or algorithm means.

Connectivity

The imaging device of the invention preferably comprises a means for connecting to a software device, preferably selected from a USB connector, Bluetooth connectivity, wireless connectivity and serial port connection routes.

The imaging device may be connected to a software device. Preferably the software device is selected from a computer, a mobile phone, a tablet and a laptop computer. Connection to a software device enables images of hair to be transferred to the software device. The images may then be displayed for viewing.

Preferably, power to the system is delivered externally from an electric grid. More preferably, power is delivered from a device, preferable a software device to which the hand held imaging device of the invention may be releasably connected. Alternatively, power can be supplied by a rechargeable battery or disposable batteries within the device.

Most preferably the means for connecting the hand held imaging device to a software device, the external viewing means and the power delivery are all facilitated through a single connection.

The Algorithm

The imaging device may be used in conjunction with a computing device (i.e. a system) which includes a user interface and a processor, the processor having been programmed to perform an algorithm. The algorithm is preferably linked to a questionnaire, comprising questions. A user of the device will answer the questions and the answers fed into the algorithm. Output can be used to provide a product recommendation to the user. Preferably, the output from the algorithm is used in conjunction with images obtained from the optics of the imaging device, to provide a product recommendation.

The algorithm carried out by the system, preferably takes the form of a processor configured to (i.e. programmed to) carry out the steps of:

providing a list of questions for the consumer, each question having a defined set of answers;

providing a plurality of product parameter inputs for each product, each product parameter input having a defined set of product parameter values;

providing a product matrix, the product matrix assigning a numerical score to each parameter value for each question;

providing a weighting factor for each product parameter input;

calculating a product score for each question using the product parameter value, the score for that value and the weighting factor for that value;

calculating a consumer score for each question using the answer chosen by the consumer;

calculating a recommendation score for each question, using the product score and the consumer score; and selecting the one or more products for recommendation to the consumer based on the recommendation score.

The algorithm thereby provides a method for recommending hair-care products according to how relevant they are for individual consumers, based on the benefits the product claims to provide.

Firstly, a participant must answer a questionnaire.

At a high level, the algorithm consists of (i.e. the processor of the claimed system is configured to implement the following features):

1. A matrix of product 'benefits' (consisting of on-pack claims, conditioning level and format type) vs a set of questions about the consumer's hair type, hair-care regime and end-look/feel requirements. The scores in the matrix are assembled such that they assign a numerical relevance to each product benefit, depending on how the consumer answers the questionnaire.

2. A product uploader function that allows products to be uploaded to the app. Products are entered into the system by choosing the product benefits from a series of drop-down menus, comprising on-pack claims, conditioning level and format type. This allows scores to be extracted from the matrix in point 1 (above) to assemble a bespoke product matrix for a particular region, country or store.

3. A weighting system for product benefits, where weightings are assigned as follows; primary on-pack claims 0.4, secondary on-pack claims 0.2, conditioning level 0.2 and format type 0.2. These weightings can be modified, if required. Each product can have one primary benefit and up to four secondary benefits.

By multiplying the matrix in point 1 by the product benefits selected in point 2 and the weightings in point 3, a database of product benefit scores vs a set of questions about the consumer's hair type, hair-care regime and end-look/feel requirements is compiled for a particular region, country or store.

The benefits of this system include the following:

Firstly, the product data-base connected to the app can be tailored at the global, regional, country or store level, such that the app only recommends products that are available to the consumer in that location;

Secondly, the product data-base can be easily updated when new products are launched, on-pack claims are updated, products are reformulated or products are de-listed.

In this way, this algorithm removes the need to manually update the product data-base, each time products are added or removed from the catalogue, thus reducing the requirement for involvement from product experts each time a new product is launched.

An example of the algorithm carried out by the system of the present invention is shown in FIGS. 8 to 11.

FIG. 8 shown data that could be provided in the form of a Master Matrix (FIG. 8a) and a Benefit Weightings table (FIG. 8b).

Further data about specific products is provided separately in the form of Product Benefit Inputs. FIG. 9a shows a first example of a Product Benefit Input for a first product, and FIG. 10a shows a Product Benefit Input for a second product. This information could be provided from a different source to the information found in the Master Matrix and Benefit Weightings tables. For example, the data for the Master Matrix and Benefit Weightings table could be produced by a first team such as a Global R&D team. The data for the Product Benefit Inputs could be provided by a separate brand team.

FIGS. 9b and 10b show examples of Product Matrices for the products of FIGS. 9a and 10a respectively. The Product Matrices access data from the Master Matrix and the Benefit Weightings table to calculate the Product Benefit Scores.

Various output tables can then be produced by the system based on the information from the Product Matrices. Examples of such tables are shown in FIGS. 11a-11d where:

FIG. 11a shows an example of a product output table;

FIG. 11b shows an example of consumer answers to questions asked at the user interface;

FIG. 11c shows an example of a calculation of recommendation scores for a first consumer based on the data collected and calculated in FIGS. 8-10; and FIG. 11d shows an example of a calculation of recommendation scores for a second consumer based on the data collected and calculated in FIGS. 8-10.

The tables shown in FIGS. 11a-11d could all be generated at a software app running on a software device such as a mobile phone, tablet or computer.

The Workstation

The workstation comprises the hand held imaging device and a screen, preferably a software device, wherein the hand held device and the screen are positioned on a unitary base. The workstation may further comprise a holder for the hand held imaging device.

The screen is preferably selected from a computer, a monitor, a mobile phone, a tablet and a laptop, most preferably a software device selected from a computer, a mobile phone, a tablet and a laptop. Preferably, the screen can be used separately or in conjunction with the microscope. The screen forms at least a part of the user interface at which a list of questions is provided to the consumer. In some embodiments, the screen (19) may be a touch screen so provides the entire user interface. In other embodiments, the user interface may take the form of the screen in conjunction with another input device (not shown) such as a mouse or keypad.

The base preferably includes cable storage. Preferably, the power inputs for the hand held imaging device and the screen are integrated into the unitary base, such that it is only necessary to connect the base to a power source in order to power all of the components.

The components of the workstation, for example the hand held imaging device, the screen, the optional holder and the base, are preferably encased in the same material as the housing (1) of the hand held imaging device. Thus the components of the workstation have a unified look and colour. The gripping area material may also be replicated on the base and/or screen casing.

The System

The system 100 for recommending one or more products may comprise a workstation 110 (which may take the form of that shown in FIG. 5) and a separate external computer 140 or server. The workstation may include the user interface 111, imaging device 112 and processor 113. The processor and imaging device may be located within a software device such as a computer, mobile phone or tablet. As shown in FIG. 6, the workstation and external computer may be connected to one another over a network 130 such as a WAN or LAN.

The external computer 140 may include the product matrix 141 and master matrix 142. In other embodiments (not shown) one or both of the product matrix and/or the master metric may be located at the workstation.

The Methods

In a preferred embodiment of the present invention, the method of recommending products from a plurality of products is targeted at hair products. In connection with this, a method for evaluating condition of hair and scalp using the imaging device, and of recommending products appropriate to the condition of the hair comprises the steps of:

1) placing hair fibres (13) in the slot (4) and obtaining a high resolution image of the fibres;

2) placing the low magnification optic (3) onto the hair or scalp and obtaining an image;

3) using the images of steps 1) and 2) to make an assessment of the condition of the hair and/or scalp; and 4) using the assessment of step 3) to provide a product recommendation.

A method for evaluating condition of hair of an individual, using the imaging device of the invention, and using the system of the present invention to recommend products appropriate to the condition of the hair is shown in FIG. 7 and comprises the steps of:

s1) placing hair fibres (13) in the slot (4) and obtaining a high resolution image of the fibres;

s2) placing the low magnification optic (3) onto the hair or scalp and obtaining an image;

s3) asking the individual to provide answers to a questionnaire at a user interface;

s4) feeding the answers arising from step 3) into an algorithm and obtaining output therefrom; and s5) using the images of steps 1) and/or 2) in conjunction with the output from the algorithm to provide a product recommendation.

In more detail, steps 3 to 5 can be broken down into the following steps:

s3a) providing a list of questions for the consumer, each question having a defined set of answers;

s4a) providing a plurality of product parameter inputs for each product, each product parameter input having a defined set of product parameter values;

s4b) providing a product matrix, the product matrix assigning a numerical score to each parameter value for each question;

s4c) providing a weighting factor for each product parameter input;

s4d) calculating a product score for each question using the product parameter value, the score for that value and the weighting factor for that value;

s4e) calculating a consumer score for each question using the answer chosen by the consumer;

s4f) calculating a recommendation score for each question, using the product score and the consumer score;

s4g) selecting the one or more products for recommendation to the consumer based on the recommendation score; and s5) combining the recommendation from the algorithm of the system with the images from steps 1) and 2).

Step s4g) at which selection of the one or more products is made may further include the steps of:

calculating a total score for each product as the sum of the recommendation scores from each question;

ranking the one or more products based on the recommendation score; and selecting the one or more products for recommendation to the consumer based on their position in the ranking.

Furthermore, the step of calculating the product score for each question preferably includes the steps of:

retrieving the product parameter value for that question;

retrieving the numerical score for that product parameter from the product matrix;

retrieving the weighting factor for that product; and multiplying the numerical score by the weighting factor to generate the product score.

Figure 5:
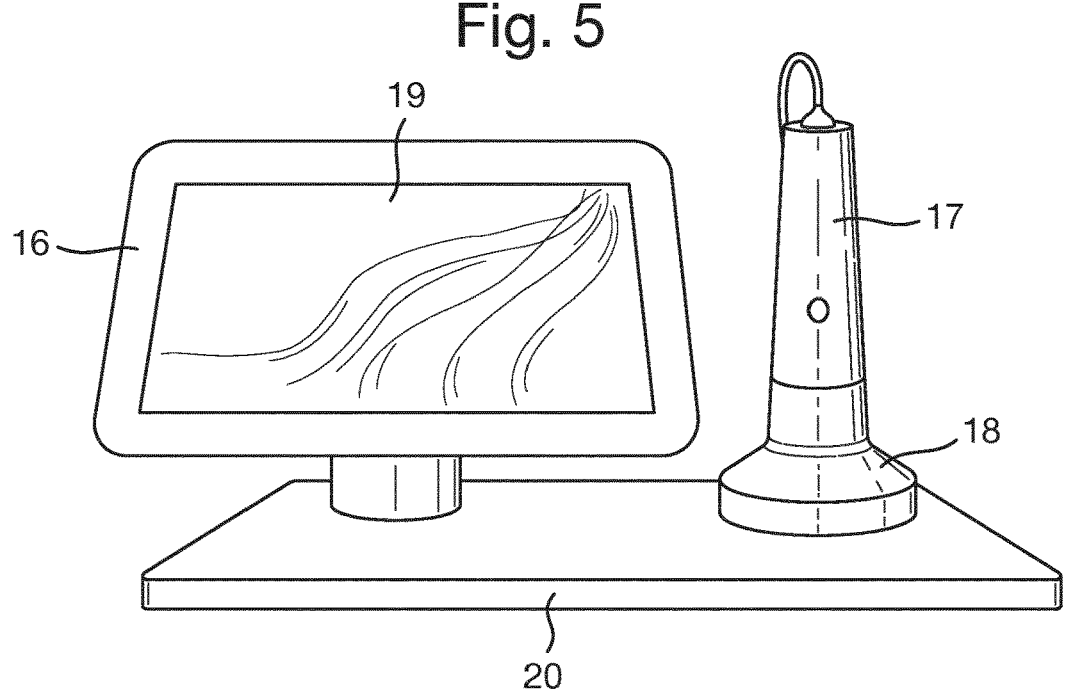
FIG. 5 is a perspective view of a workstation (16) comprising the hand held imaging device.
Figure 6:
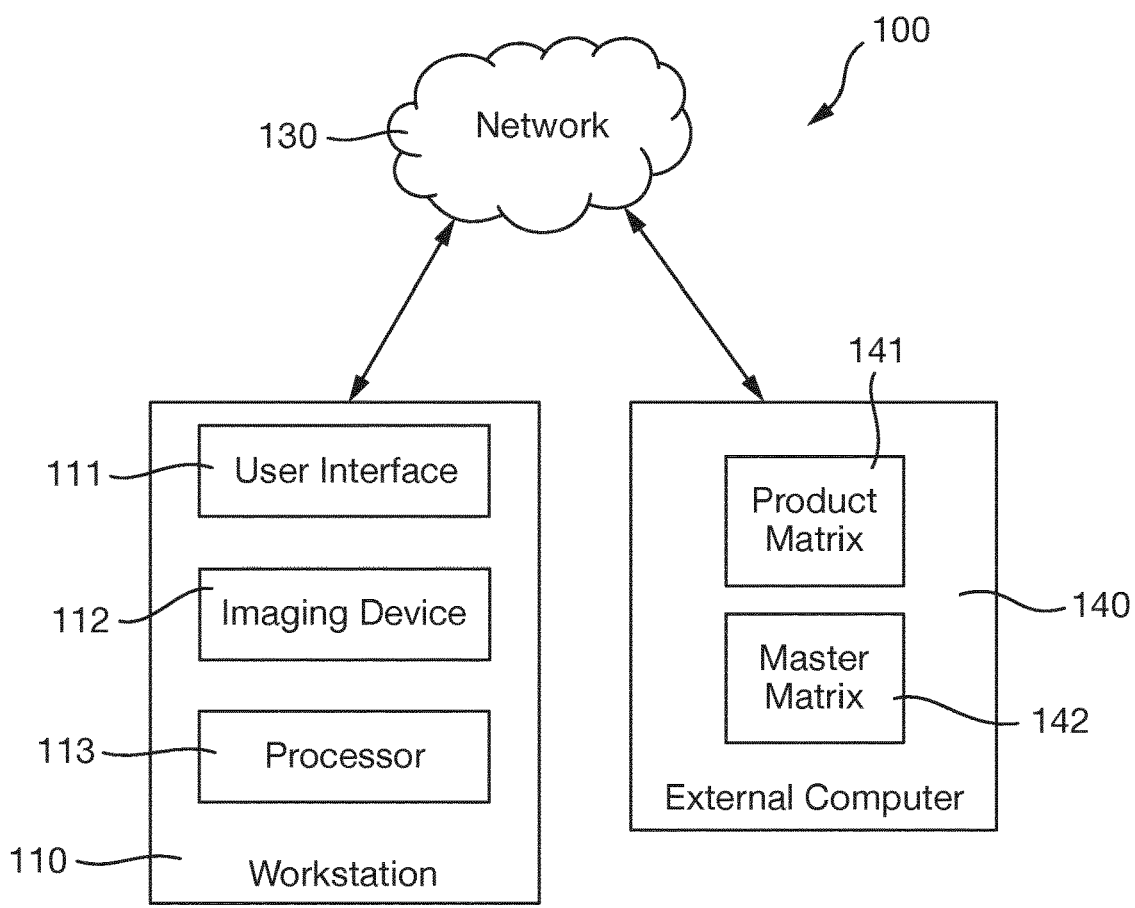
FIG. 6 is an example of a system according in accordance with the invention.

In embodiments such as that shown in FIG. 5, the workstation is capable of providing a product recommendation to the user based on more than one type of user input.

Where the user wishes to use the imaging device to collect an input, the processor of the workstation may be programmed to:

assign a numerical value to the measurement of the physical property of the hair; and use this numerical value to calculate a recommendation score based on the physical property of the hair.

The recommendation score based on the physical property can therefore be calculated by the processor in addition to or instead of the recommendation score which results from the input by the consumer at the user interface.

In some embodiments, the step of assigning a numerical value to the measurement of the physical property of the hair involves:

a) capturing an image of the hair b) comparing the resulting image to a set of stored images, the stored images having associated numerical values; and c) returning a numerical value (which is used as the recommendation score). The stored images will be stored in a database which may be located locally within the memory of the system upon which the application is running. Alternatively, the stored images may be located on an external computing device or server. Regardless of the location of the database, each image within the database will include an assigned numerical value. Upon looking up the images, the stored image corresponding closest to the captured image is selected, and the associated numerical value of that image is returned to the processor of the system. The returned numerical value forms the "recommendation score based upon the physical property of the hair".

To provide more flexibility to the user, the recommendation process may follow any one of three alternatives:

a) the one or more products for recommendation to the consumer is selected based on the recommendation score calculated in response to the input by the consumer at the user interface;

(b) the one or more products for recommendation to the consumer is returned based on a lookup of the recommendation score based on the physical property of the hair; or (c) the recommendation score calculated in response to the input by the consumer at the user interface is combined with the recommendation score based on the physical property of the hair to create an overall recommendation score, and the one or more products for recommendation to the consumer is returned based on a lookup of said overall recommendation score.

The above methods may be carried out on hair that is attached to a participant's head, or on loose (detached) hair. Where the method is carried out on hair that is attached to a participant's head, step 1) is preferably carried out on the shaft and tips of the hair fibres, and step 2) is preferably carried out at the root end of the hair.

The hand held imaging device is particularly useful in assessing one or more of the following aspects of hair and scalp condition (i.e. the following properties of the hair). Hair alignment, cuticle condition and colour fade can be assessed along the entire length of the hair fibre. Split ends, bobbles and kinks are particularly relevant to assessment at the tip end of the hair fibre. Indicators of scalp condition such as flakes, dryness and greasiness are advantageously evaluated using the hand held imaging device of the invention, as are fibre density (i.e. the number of fibres per unit area) and multiple occupancy (the number of fibres per follicle).

The number of hair fibres used in the above methods is preferably from 1 to 100, more preferably from 5 to 50.

A participant may monitor their hair and scalp over a period of time. A product recommended by the program to adjust the participant's hair and/or scalp into an improved condition may be applied over the monitored period. The method(s) given above may be repeated. This allows a consumer to evaluate effectiveness of the product or any other products that might be applied to improve the hair and/or skin (scalp) condition.

The invention claimed is:

1. A workstation comprising:
an imaging device for measuring one or more physical properties of hair belonging to a consumer, the imaging device comprising:
a high magnification optic configured to capture a high magnification image of surface characteristics of hair fibres, the high magnification optic comprising a first lens and a first light source, the high magnification optic having a fixed focal length and a slot for locating hair fibres in frame such that the hair fibres are in focus;
a low magnification optic configured to capture a low magnification image of at least one of a scalp or hair independent of the high magnification optic, the low magnification optic comprising a second lens and a second light source; and
a viewing means comprising at least one of an integral viewing means or an external viewing means; and
a system for recommending one or more products to the consumer from a plurality of products, the system comprising:
a user interface; and
a processor configured to:
provide a list of questions for the consumer at the user interface, each question having a defined set of answers;
receive a selected answer from the consumer at the user interface, the selected answer being one of the defined set of answers for each question;
access a plurality of product parameter inputs for each product, each product parameter input having a defined set of product parameter values;
access a product matrix, the product matrix assigning a numerical score to each product parameter value for each question;
access a weighting factor for each product parameter input;
calculate a product score for each question using the product parameter value, the numerical score for the product parameter value, and the weighting factor for the product parameter value;
calculate a consumer score for each question using the selected answer;
calculate a product recommendation score for each question using the product score and the consumer score;
cause at least one of:
the high magnification optic to capture the high magnification image independent of the low magnification optic; or
the low magnification optic to capture the low magnification image independent of the high magnification optic;
determine the one or more physical properties from at least one of the high magnification image or the low magnification image;
assign a numerical value to one or more measurements of the one or more physical properties of the hair determined from the at least one of the high magnification image or the low magnification image;
calculate a property recommendation score based on the one or more physical properties using the numerical value, the property recommendation score calculated after receiving the selected answer for each question; and
select the one or more products for recommendation to the consumer based on an overall recommendation score;
wherein the product recommendation score calculated for each question using the product score and the consumer score is combined with the property recommendation score based on the one or more physical properties to create the overall recommendation score; and
wherein the one or more products for recommendation to the consumer is returned based on a lookup of the overall recommendation score.

2. The workstation of claim 1, wherein the assigning of the numerical value involves:
comparing the at least one of the high magnification image or the low magnification image to a set of stored images, the stored images having associated numerical values; and
returning one of the associated numerical values as the property recommendation score based on the one or more physical properties.

3. The workstation of claim 1, wherein:
the assigning of the numerical value further involves selecting a selected stored image of the set of stored images, the selected stored image corresponding closest to the at least one of the high magnification image or the low magnification image; and
the associated numerical value of the selected stored image forms the property recommendation score based on the one or more physical properties.

4. The workstation of claim 1, wherein, when selecting the one or more products, the processor is configured to:
calculate a total score for each product as a sum of the product recommendation scores for each question;
rank the one or more products based on the total scores; and
select the one or more products for recommendation to the consumer based on their position in the ranking.

5. The workstation of claim 1, wherein the one or more products are hair products.

6. The workstation of claim 1, wherein the numerical scores include both positive and negative numbers.

7. The workstation of claim 1, wherein, when calculating the product score for each question, the processor is configured to:
retrieve the product parameter value for that question;
retrieve the numerical score for that product parameter value from the product matrix;
retrieve the weighting factor for that product; and
multiply the numerical score by the weighting factor to generate the product score.

8. The workstation of claim 1, further comprising a master matrix which stores numerical values for each question, for each product parameter value.

9. The workstation of claim 8, wherein the product matrix retrieves numerical scores for each product parameter input of that product from the master matrix.

10. A method of recommending one or more products to a consumer from a plurality of products, the method comprising:
providing, by a workstation, a list of questions for the consumer, each question having a defined set of answers;

receiving, by the workstation, a selected answer from the consumer, the selected answer being one of the defined set of answers for each question;

providing a plurality of product parameter inputs for each product, each product parameter input having a defined set of product parameter values;

providing a product matrix, the product matrix assigning a numerical score to each product parameter value for each question;

providing a weighting factor for each product parameter input;

calculating a product score for each question using the product parameter value, the numerical score for the product parameter value, and the weighting factor for the product parameter value;

calculating a consumer score for each question using the selected answer;

calculating a product recommendation score for each question using the product score and the consumer score;

capturing, using an imaging device, a low magnification image of hair;

capturing, using the imaging device, a high magnification image of the hair, the high magnification image captured independent of the low magnification image;

determining a measurement of a physical property of the hair based on at least one of the high magnification image or the low magnification image;

assigning a numerical value to the measurement of the physical property of the hair; and using this numerical value to calculate a property recommendation score based on the physical property, the property recommendation score based on the physical property being calculated in addition to the product recommendation score calculated using the product score and the consumer score; and selecting the one or more products for recommendation to the consumer based on an overall recommendation score;

wherein the product recommendation score calculated using the product score and the consumer score is combined with the property recommendation score based on the physical property of the hair to create the overall recommendation score, and the one or more products for recommendation to the consumer is returned based on a lookup of the overall recommendation score.

11. The method of claim 10, wherein the selection of the one or more products includes the steps of:

calculating a total score for each product as a sum of the product recommendation scores for each question;

ranking the one or more products based on the total scores; and selecting the one or more products for recommendation to the consumer based on their position in the ranking.

12. The method of claim 10, wherein the step of calculating the product score for each question includes the steps of:

retrieving the product parameter value for that question;

retrieving the numerical score for that product parameter value from the product matrix;

retrieving the weighting factor for that product; and multiplying the numerical score by the weighting factor to generate the product score.

13. A workstation comprising:

an imaging device for measuring a physical property of a hair, the imaging device comprising:

a high magnification optic configured to capture a high magnification image of surface characteristics of at least a portion of the hair, the high magnification optic comprising a first lens and a first light source, the high magnification optic having a fixed focal length and a slot for positioning the portion of the hair such that the portion of the hair is in focus;

a low magnification optic configured to capture, independent of the high magnification optic, a low magnification image of at least one of a scalp or at least a second portion of the hair, the low magnification optic comprising a second lens and a second light source; and a viewing means comprising at least one of an integral viewing means or an external viewing means; and a system for recommending a recommended product to a consumer based on a potential product, the system comprising:

a user interface; and a processor configured to:

provide a question for the consumer at the user interface, the question having a defined set of answers;

receive a selected answer from the consumer at the user interface, the selected answer being one of the defined set of answers;

access a product parameter input for the potential product, the product parameter input having a product parameter value;

access a product matrix, the product matrix assigning a numerical score to the product parameter value;

access a weighting factor for the product parameter input;

calculate a product score for the question using the product parameter value, the numerical score, and the weighting factor;

calculate a consumer score for the question using the selected answer;

calculate a product recommendation score for the question using the product score and the consumer score;

cause at least one of:

the high magnification optic to capture the high magnification image independent of the low magnification optic; or the low magnification optic to capture the low magnification image independent of the high magnification optic;

determine the physical property from at least one of the high magnification image or the low magnification image;

assign a numerical value to a measurement of the physical property of the hair determined from the at least one of the high magnification image or the low magnification image;

calculate a property recommendation score based on the physical property and using the numerical value, the property recommendation score calculated after receiving the selected answer;

calculate an overall recommendation score based on the product recommendation score and the property recommendation score; and select the recommended product based on the overall recommendation score.

14. The workstation of claim 13, wherein the assigning of the numerical value comprises:

comparing the at least one of the high magnification image or the low magnification image to a stored image, the stored image having an associated stored numerical value; and returning the associated stored numerical value as the property recommendation score.

15. The workstation of claim 13, wherein the selecting the recommended product comprises:

calculating a total score for the potential product as a sum of the product recommendation score and the property recommendation score;

ranking the potential product in a ranking based on the total score; and selecting the recommended product based on the ranking.

16. The workstation of claim 13, wherein the calculating the product score comprises:

retrieving the product parameter value;

retrieving the numerical score for the product parameter value from the product matrix;

retrieving the weighting factor; and multiplying the numerical score by the weighting factor to generate the product score.

* * * * *